(12) United States Patent
Waterston

(10) Patent No.: US 9,247,847 B2
(45) Date of Patent: Feb. 2, 2016

(54) METAL MESH FOOD WRAP

(75) Inventor: Helen Waterston, Wishaw (GB)

(73) Assignee: MANULATEX-FRANCE S.A.S., Champtoce sur Loire (FR)

( * ) Notice: Subject to any disclaimer, the term of this patent is extended or adjusted under 35 U.S.C. 154(b) by 146 days.

(21) Appl. No.: 13/066,456

(22) Filed: Apr. 15, 2011

(65) Prior Publication Data

US 2012/0061402 A1 Mar. 15, 2012

(30) Foreign Application Priority Data

Sep. 13, 2010 (GB) .................................. 10151900

(51) Int. Cl.
*A47J 37/00* (2006.01)
*A47J 36/22* (2006.01)
*A47J 36/00* (2006.01)
(Continued)

(52) U.S. Cl.
CPC .................. *A47J 36/22* (2013.01); *A21B 3/155* (2013.01); *A47J 36/00* (2013.01); *A47J 36/02* (2013.01); *A47J 36/06* (2013.01); *A47J 37/00* (2013.01); *B65D 65/00* (2013.01); *B65D 65/02* (2013.01); *B65D 81/34* (2013.01); *B65D 81/343* (2013.01); *B65D 81/3407* (2013.01);
(Continued)

(58) Field of Classification Search
CPC ........ B65D 65/00; B65D 65/02; B65D 81/34; B65D 81/343; B65D 81/3407; B65D 81/3492; A47J 37/0786; A47J 37/067; A47J 37/0694; A47J 37/101; A47J 37/108; A47J 36/06; A47J 43/18; A23B 4/10
USPC ............ 383/105, 110, 117; 229/87.08, 87.11; 99/403, 407, 426, 450; 220/573.1, 220/573.3–573.5; 426/523, 113, 394, 412, 426/415, 396
See application file for complete search history.

(56) References Cited

U.S. PATENT DOCUMENTS 895,657 A * 8/1908 Moll ............................... 99/450
1,814,378 A * 7/1931 Gilbertson et al. ........... 383/117
(Continued)

FOREIGN PATENT DOCUMENTS

| EP | 1988027 A1 | 11/2008 |
| FR | 430458 A | 10/1911 |
| WO | WO-0165946 A1 | 9/2001 |

OTHER PUBLICATIONS

Lanarkshire Woman's Tasty Idea is a TV Hit, http://lanarkshire.com/south-lanarkshire-business-directory-browse-listings/?object=news&id=314, Jun. 9, 2010.
(Continued)

*Primary Examiner* — Jes F Pascua
*Assistant Examiner* — Nina Attel
(74) *Attorney, Agent, or Firm* — Winstead PC

(57) ABSTRACT

Method and apparatus for a flexible, metal mesh food wrap made up of interlocking flexible metal rings or links which, together with the air pockets between the rings, act as an insulating layer as it is wrapped around the food item during and after the cooking process. The flexible, metal mesh is formed of individual interlocking rings being formed into a flexible sheet of metal mesh. The flexible metal mesh is wrapped around the meat item during the cooking process so that the rings and the air pockets thereinbetween act as a insulating layer to retain heat in the food item during and after the cooking process to allow the natural juices to permeate through the food item without the food item losing its heat so that heat and moisture loss are reduced in order to increase flavor and reduce shrinkage.

3 Claims, 2 Drawing Sheets

(51) Int. Cl.
    *B65D 65/00*    (2006.01)
    *B65D 81/34*    (2006.01)
    *B65D 65/02*    (2006.01)
    *A47J 36/06*    (2006.01)
    *A21B 3/15*     (2006.01)
    *A47J 36/02*    (2006.01)

(52) U.S. Cl.
    CPC .... *B65D 81/3461* (2013.01); *B65D 2581/3418* (2013.01); *B65D 2581/3458* (2013.01); *Y10T 29/49* (2015.01)

(56) References Cited

U.S. PATENT DOCUMENTS

| | | | | |
|---|---|---|---|---|
| 2,509,727 | A * | 5/1950 | Davis | A47J 43/18 245/8 |
| 2,518,406 | A * | 8/1950 | Weber | A47J 43/18 426/129 |
| 2,902,371 | A * | 9/1959 | Morris Shorr | A23L 1/3103 426/113 |
| 3,358,872 | A | 12/1967 | Johnson | |
| 3,730,076 | A * | 5/1973 | Levin | A47J 36/022 229/5.82 |
| 4,329,977 | A | 5/1982 | Orter | |
| 4,697,732 | A | 10/1987 | Altus | |
| 4,747,392 | A | 5/1988 | Rogers | |
| 4,877,933 | A | 10/1989 | Yangas | |
| 4,942,809 | A * | 7/1990 | Simmons | A47J 43/18 383/117 |
| 4,985,300 | A * | 1/1991 | Huang | 428/332 |
| 5,003,142 | A * | 3/1991 | Fuller | 219/730 |
| 5,206,045 | A * | 4/1993 | Stuck | 426/243 |
| 5,223,288 | A | 6/1993 | Mendenhall et al. | |
| 5,308,690 | A * | 5/1994 | Butcher, Jr. | 442/16 |
| 6,016,744 | A | 1/2000 | Pritsker | |
| 6,093,920 | A * | 7/2000 | Beckwith | A23L 1/0128 219/725 |
| 6,188,055 | B1 | 2/2001 | Walters | |
| 6,237,803 | B1 | 5/2001 | Sarnoff et al. | |
| D484,736 | S | 1/2004 | Sarnoff | |
| 7,258,063 | B2 * | 8/2007 | Kiplinger et al. | 99/426 |
| 2004/0219284 | A1 | 11/2004 | Bruno | |
| 2005/0230987 | A1 * | 10/2005 | Bright | A47J 43/18 294/152 |
| 2005/0233034 | A1 * | 10/2005 | Unwin | 426/107 |
| 2008/0087268 | A1 * | 4/2008 | Burton | B65D 81/3492 126/9 R |
| 2009/0261102 | A1 * | 10/2009 | Sparks | 220/372 |
| 2012/0009316 | A1 * | 1/2012 | Dickie | A23B 4/10 426/389 |

OTHER PUBLICATIONS

Wishaw Woman Invents Innovative Cooking Implement, http://wishawpress.co.uk/wishaw-news/local-wishaw-news/wishaw-news/2010/06/16/wishaw-woman-invents-innovative-cooking-implement-76495-26657372.

* cited by examiner

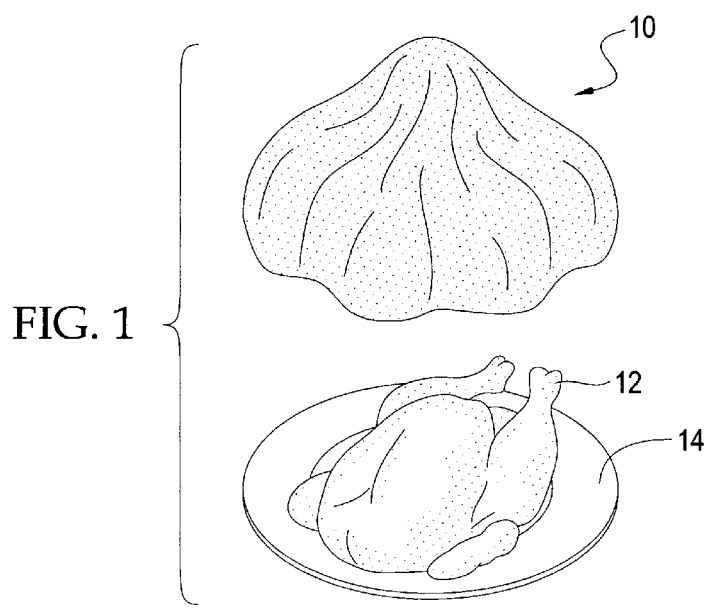
FIG. 1
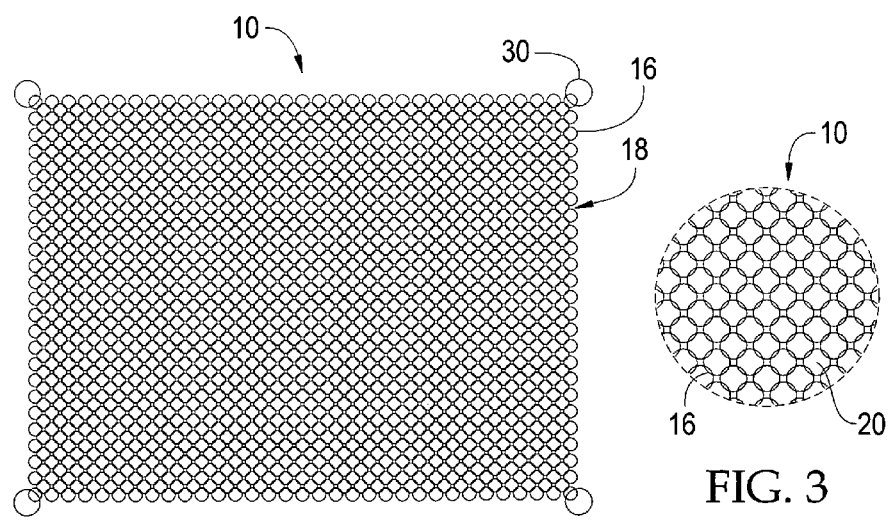
FIG. 2
FIG. 3

METAL MESH FOOD WRAP

BACKGROUND OF THE INVENTION

1. Field of the Invention

The present invention relates generally to cooking utensils and, more particularly, is concerned with a metal mesh food wrap for covering food items while they are being cooked.

2. Description of the Related Art

Food covers have been described in the related art, however, none of the related art devices disclose the unique features of the present invention.

In U.S. Design Pat. No. D 484,736 dated Jan. 6, 2004, Sarnoff disclosed a foil roaster tent. In U.S. Pat. No. 4,747,392 dated May 31, 1988, Rogers disclosed a domed screen. In U.S. Patent Application Publication No. 2004/0219284 dated Nov. 4, 2004, Bruno disclosed a poultry roast gathered in a net holding portions together. In U.S. Pat. No. 6,016,744 dated Jan. 25, 2000, Pritsker disclosed methods and devices for cooking poultry. In U.S. Pat. No. 4,877,933 dated Oct. 31, 1989, Yangas disclosed a method and apparatus for controlling distribution and power for promoting the uniform heating of a food product in a radiant energy field. In U.S. Pat. No. 4,329,977 dated May 18, 1982, Orter disclosed a rotatable cooker. In U.S. Pat. No. 6,237,803 dated May 29, 2001, Sarnoff, et al., disclosed a roasting and pan/cover assembly. In U.S. Pat. No. 3,358,872 dated Dec. 19, 1967, Johnson disclosed an oven protector.

While these food covers may be suitable for the purposes for which they were designed, they would not be as suitable for the purposes of the present invention as hereinafter described.

SUMMARY OF THE PRESENT INVENTION

The present invention discloses a flexible, metal mesh food wrap made up of interlocking flexible metal rings or links which, together with the air pockets between the rings, act as an insulating layer as it is wrapped around the food item during and after the cooking process. The flexible, metal mesh is formed of individual interlocking rings being formed into a flexible sheet of metal mesh. The flexible metal mesh is wrapped around the meat item during the cooking process so that the rings and the air pockets thereinbetween act as a insulating layer to retain heat in the food item during and after the cooking process to allow the natural juices to permeate through the food item without the food item losing its heat so that heat and moisture loss are reduced in order to increase flavor and reduce shrinkage.

An object of the present invention is to provide a flexible metal wrap to be placed about food items during the cooking process. Another object of the present invention is to increase moisture retention and reduce shrinkage of the food item during and after the cooking process. A further object of the present invention is to provide an insulating layer about the food item to reduce the heat loss process which normally occurs after cooking. A further object of the present invention is to provide a flexible food wrap which can be easily used by the cook. A further object of the present invention is to provide a flexible food wrap which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the present invention.
FIG. 2 is a plan view of the present invention.
FIG. 3 is an enlarged partial view of the present invention.

LIST OF REFERENCE NUMERALS

Figure 4:
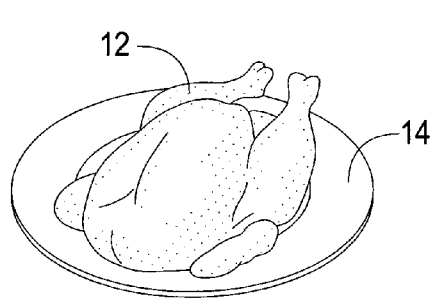
FIG. 4 is a perspective view of a food item.

With regard to reference numerals used, the following numbering is used throughout the drawings.

10 present invention
12 food item
14 platter
16 ring/link
18 sheet
20 air pocket
22 oven
24 cooking apparatus
26 heat energy arrow
28 bag
30 enlarged ring

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a method and apparatus for a food wrap is disclosed.

Turning to FIG. 1, therein is shown the present invention 10 being a flexible metal mesh food wrap which is also known as a mail, chain mail, or sometimes, maille. The wrap is made of a plurality of interconnected or interlinked small metal links or rings as best shown in FIGS. 2-3. Also shown is a food item 12 being disposed on a platter 14. Note that food item 12 is shown by way of example as a piece of poultry, however, this is merely exemplary and any food item could be used, for example, steak, roast meats, other meats and/or other food items.

Turning to FIG. 2, therein is shown the present invention 10 made up of a pattern of linked individual rings or links 16 which are manufactured into a flexible metal chain mail food wrap which may be in the form of a sheet 18 being shown in FIG. 2, for example, as rectangular shaped but which may be made in other shapes desirable for a food wrap. Also shown are enlarged corner rings 30 at each corner which are useful for removing the food wrap 10 when it is very hot by picking it up with a pot holder, fork, skewer or the like. By way of another example, FIG. 7 shows the food wrap made into a bag 28 so that the food item 12 could simply be inserted into the bag through its opening and then cooked in the bag.

Turning to FIG. 3, therein is shown an enlarged partial view of a portion of the present invention 10 and shows the individual rings or links 16 along with air spaces or pockets 20 disposed therein between the links 16. The air pockets 20 disposed between the links 16 act as an additional insulating layer of air which along with the properties of the metal slow the heat loss process from the food item 12 following the cooking process. The individual links 16 may be made in circular shapes or other shapes such as square, oval, or similar.

Figure 5:
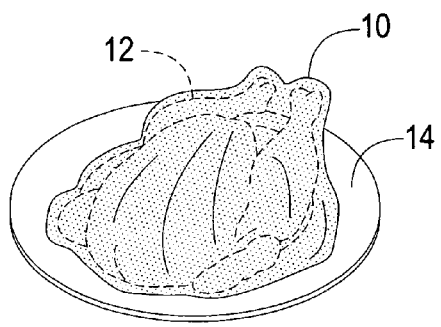
FIG. 5 is a perspective of the present invention in operative connection with the food item of FIG. 4.
Figure 6:
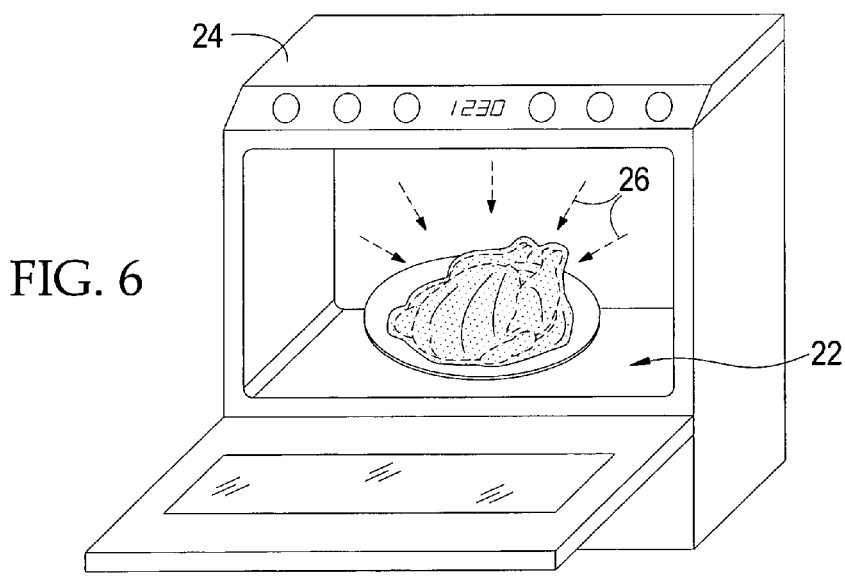
FIG. 6 is a perspective view of the present invention taken from FIG. 5 inside an oven.

Turning to FIGS. 4 through 6, therein is shown an exemplary method of using the present invention 10 wherein a food item 12 is placed on a platter 14; thereafter, the food wrap of the present invention 10 is disposed over the food item; and, the food item having the present invention wrapped about it is then placed inside the oven 22 of a heating apparatus 24 so that heat energy 26 cooks the food item as show by the arrow or vector 26. The heating apparatus 24 could be a conventional stove, a microwave oven, or any other suitable industrial or domestic convection type oven or the like.

Figure 7:
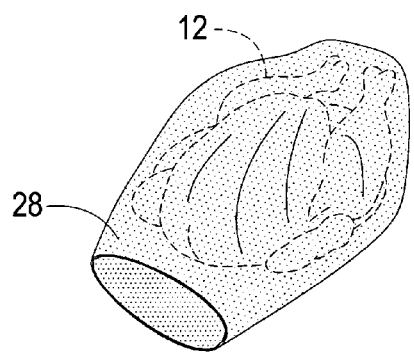
FIG. 7 is a perspective view of the present invention in the form of a bag.

Turning to FIG. 7, the food wrap of the present invention 10 is shown made into a bag 28, for example, so that the food item 12 could simply be inserted into the bag through its opening and then cooked in the bag. Other configurations and shapes of the present invention 10 may also be possible.

The following additional general explanation is also provided by reference to FIGS. 1-7. The present invention 10 relates to the protection of food 12 during the cooking process of roasting, steaming or grilling using convection or direct heat sources.

Referring generally to FIGS. 4-6, FIG. 5 shows the covering of food 12 with the metal mesh food wrap 10 prior to the process of cooking. When food or meats 12 are cooked they are exposed to direct heat 26 which leads to moisture loss and thus shrinkage. The metal mesh food wrap 10 creates a surface protector from the external heat source 22 directing heat inwards, retaining the heat and moisture therefore reducing shrinkage. When foods 12 are removed from heat source 24, the metal mesh wrap 10 facilitates heat retention allowing sufficient time for the juices to permeate and moisten the food without loss of temperature.

Referring more specifically to FIGS. 2-3, therein is shown more details of the food wrap 10. The application of the metal mesh food wrap 10 increases moisture retention and reduces meat/food shrinkage. The air pockets 20 between the links 16 of the sheet 18 act as an insulating layer, which, along with the properties of metal, slow the heat loss process. The air pockets 20 between the links 16 still allow the surface of the food 12 to brown and crisp but without burning. The air pockets 20 allow heat and air to naturally permeate the surface of the meat 12 resulting in a natural browning sheen to finished food.

In commercial kitchen and carvery conditions, with regard to health and safety, the hot holding temperature for roast meats is about 82 degrees C. and cannot go below 62 degrees C. The application of the metal mesh food wrap 10 maintains the temperature above 62 degrees for a longer period of time.

In exposed buffet or carvery conditions the metal mesh 10 creates a hygienic blanket cover over the food 12.

The metal mesh chain mail 10 is expected to be made of stainless steel which is non-reactive with food and acids, however, it may be that other metals may also be used. It can withstand high and low temperatures. It is reusable, easy to clean and dishwasher proof. With the application of the metal mesh food wrap 10 cooking time can be reduced thus saving energy. Heat is stored in the metal wrap 10 allowing the cooking process to continue after the heat source 22 has been turned off. Unlike domestic aluminum foil, the metal mesh food wrap 10 is dishwasher proof/washable and wholly reusable. Also, unlike domestic aluminum foil, the metal mesh food wrap 10 is made up of interlocking rings 16 which allow the heat and air to naturally permeate the surface of the food allowing browning and crisping. The interlocking links 16 of the stainless steel chain mail 10 make this product fully flexible, protecting the entire surface of the foodstuff 12 applied to regardless of shape. Also, the present invention 10 provides reduced weight loss relative to cooking without it, and, it maintains a more uniform temperature in a domestic oven where the thermostat can result in a variation of +/−10 degrees, and, one can baste meat through the mesh compared to foil which has to be removed.

The metal mesh food wrap 10 can be used after conventional cooking/roasting to assist in the resting of food 12 without substantial loss of temperature. The heat is retained while the natural juices of the food 12 are able to permeate throughout. The application of the metal mesh food wrap 10 can also maintain food shape which is important in presentation and portion uniformity. Shape and moisture retention also facilitate easier carving. Also, in industrial convection ovens, the use of conventional aluminum foil for protective purposes can be problematic as the strength of the fan can draw the foil into the blades, thus shredding it and contaminating the food.

Furthermore, the present invention 10 provides: 1) A reusable, metal mesh food wrap 10 which prolongs the retention of heat in cooked food 12 and reduces temperature loss; 2) A reusable metal mesh food wrap 10 which retains the natural moisture in the food 12 thus reducing shrinkage; 3) A reusable metal mesh food wrap 10 made up of interconnecting rings 16 producing small uniform air pockets 20 which make up an insulating layer; 4) A reusable metal mesh food wrap 10 made of stainless steel rings 16 which are inert and non-reactive with foods 12 and acids; 5) A food wrap 10 which is non-corrosive, washable and reusable; 6) A food wrap 10 in which the wrap protects the surface of the food 12 from burning; 7) A food 12 covering which acts as a hygienic insulation blanket; 8) A reusable metal mesh food wrap 10 which allows the food 12 to "rest" and the natural juices to permeate without losing heat; 9) The flexibility and density of the wrap 10 retains moisture and shape of food 12 facilitating the ease of carving; and, 10) Retention of natural juices increases and enhances flavor of food 12.

By way of summary, the metal mesh food wrap of the present invention comprises a metal mesh food wrap 10 used to protect and enhance food 12 during and/or after the cooking process to allow food, especially roast meats, to rest prior to serving. During the cooking process foods 12 are exposed to heat which can lead to moisture loss and thus shrinkage. After the cooking process food 12 is best left to "rest" so that the natural juices permeate back through the food. However, this "resting" process can lead to a loss in temperature of the food 12. With the application of the metal mesh food wrap 10 this temperature loss can be greatly reduced. This is a reusable food covering 10 which may be made up of interlocking flexible metal rings 16 which, together with the air pockets 20 between the links, act as an insulating layer. The main purpose of this covering 10 is to retain heat in food 12 during and after cooking to allow the natural juices to permeate through without the food substance losing its heat. It can be applied before or after cooking and will reduce heat and moisture loss thus increasing flavor and reducing shrinkage.

What is claimed to be new and desired to be protected by Letters Patent is set forth in the appended claims:

1. A method of using a food wrap to cook a food item, the method comprising:
    providing a food wrap comprising a single flexible layer of metal mesh, the metal mesh comprising a plurality of interlinked homogenous metal rings of uniform size;
    wherein the food wrap is flexible and free of frame members;
    disposing the single flexible layer of metal mesh over the food item such that the food wrap is wrapped about the food item; and
    cooking the food item while the food wrap is wrapped about the food item so as to insulate the food item during the cooking.

2. The method of claim 1, wherein the food wrap is made of stainless steel.

3. The method of claim 1, wherein the food wrap has a plurality of air pockets therein, wherein the air pockets provide an insulating layer while the food item is being cooked.

\* \* \* \* \*